July 25, 1961   O. E. JOHANSSON   2,993,689
POWER SPRING
Filed June 27, 1958   2 Sheets-Sheet 1
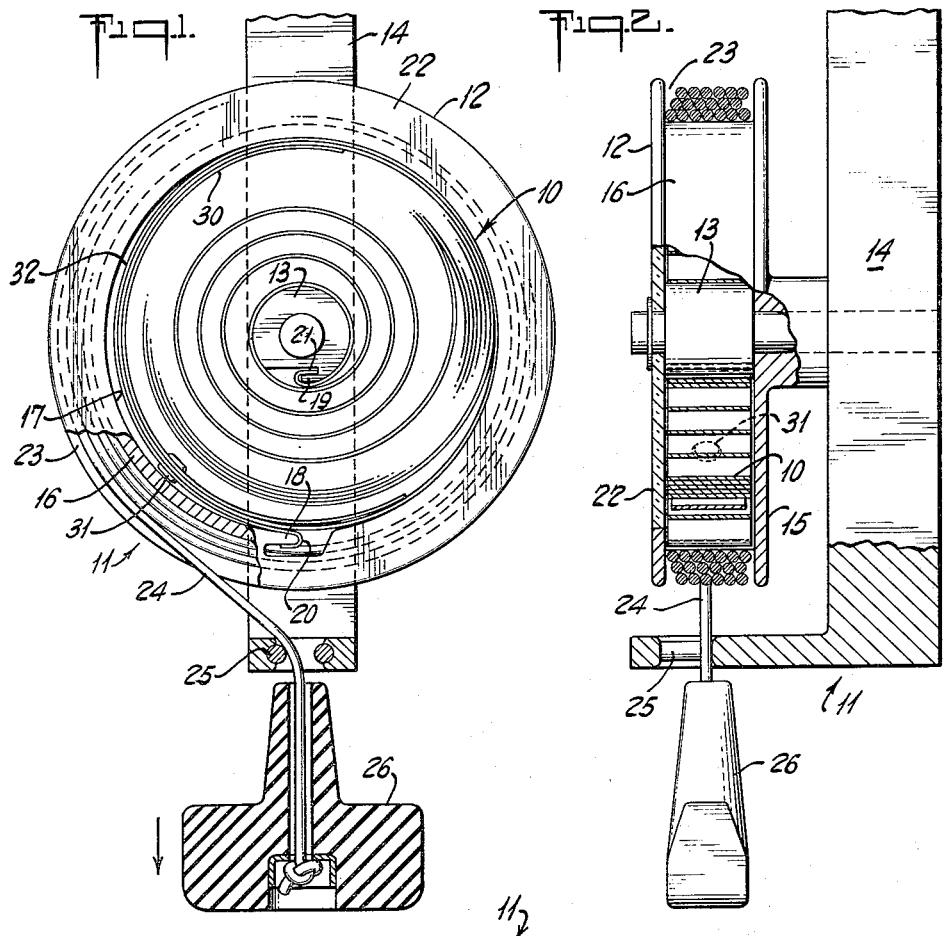
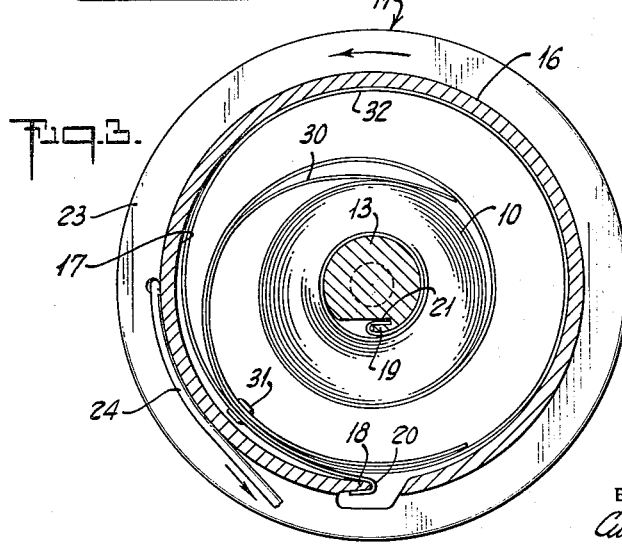
INVENTOR
OSCAR E. JOHANSSON
BY
Curtis, Morris & Safford
ATTORNEYS July 25, 1961  O. E. JOHANSSON  2,993,689
POWER SPRING
Filed June 27, 1958  2 Sheets-Sheet 2
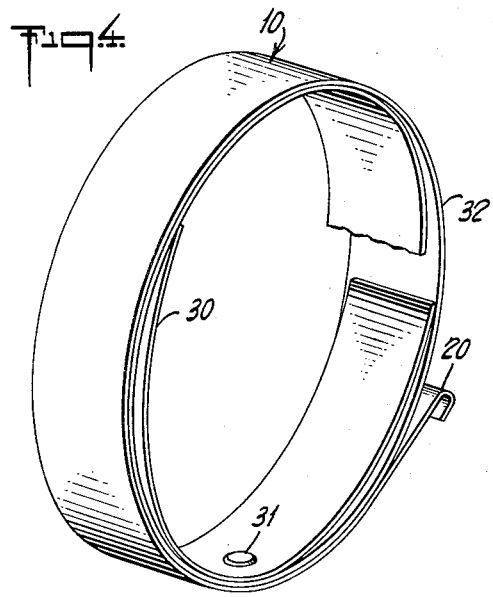
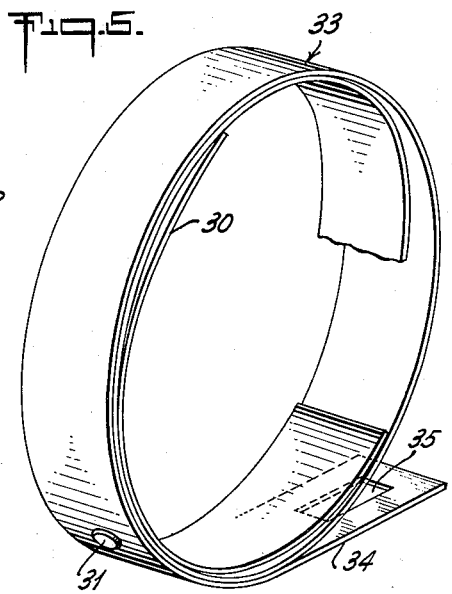
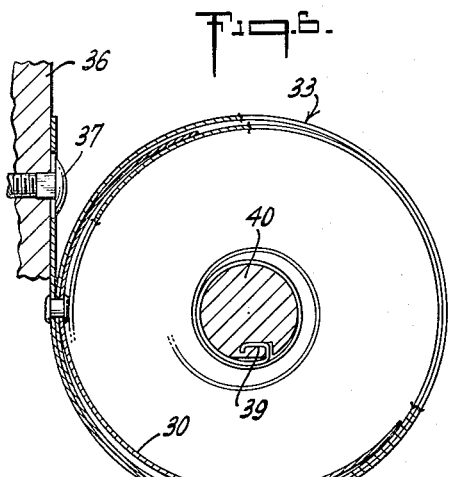
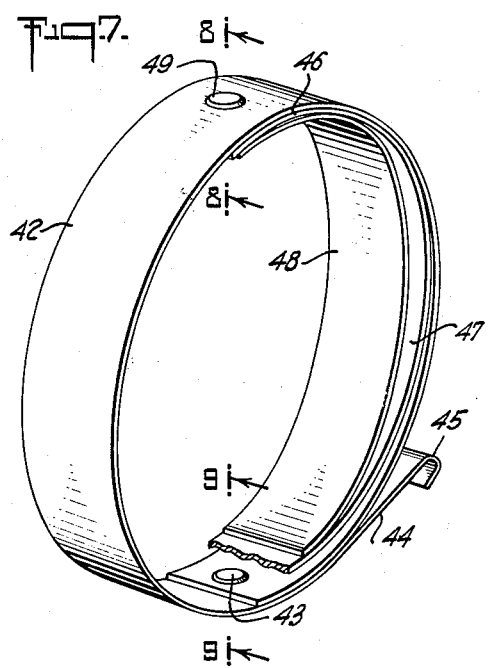
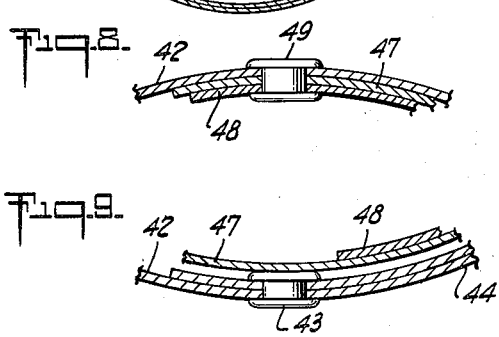
INVENTOR
OSCAR E. JOHANSSON
BY
Curtis, Morris & Safford
ATTORNEYS United States Patent Office 2,993,689
Patented July 25, 1961

2,993,689
POWER SPRING
Oscar E. Johansson, Fair Lawn, N.J., assignor to Sandvik Steel, Inc., Fair Lawn, N.J., a corporation of New York
Filed June 27, 1958, Ser. No. 745,205
6 Claims. (Cl. 267—1)

The present invention relates to springs and more particularly to helically coiled springs for storing energy as the spring is wound and for delivering the stored energy when it unwinds.

Such springs have a multitude of different uses for either storing energy slowly and delivering the stored energy quickly, or for storing energy quickly and delivering the stored energy at a slow rate. For purposes of description in the specification and claims, all such helically coiled springs are referred to as power springs without distinction as to their particular use, application or installation.

Power springs are usually enclosed in a rotating barrel or fixed housing with one end anchored thereto and its other end anchored to an axial post or rotating shaft. The barrel may rotate with respect to the axial post, or the axial shaft may rotate with respect to the fixed housing. In either case, the initial installation or replacement of such a spring is apt to present a time consuming nuisance problem. If the spring is in an extended or unwound condition it must be coiled to a diameter to adapt it to fit into the barrel or housing. With a heavy duty power spring this procedure is impractical. Usually, such a spring is wound by a machine to a small diameter at the factory where it is manufactured and a peripheral band or keeper is applied around its outer periphery. Such keepers facilitate handling during the shipment and installation. Such a retaining band or keeper constitutes an additional element, and installation of the spring involves transferring it from its keeper to the barrel or housing, after which the spring end is attached to the housing. If a heavy duty power spring escapes from its keeper before or during installation, it is a hazard at the time of its escape, and it must be returned to the factory to be rewound and confined.

A wound power spring tends to unwind in asymmetrical loops extending outwardly from one side of the arbor. This asymmetrical unwinding causes the loops to engage and rub each other which, in turn, produces excessive friction and binding of the loops of the spring. Such friction and binding produces uneven unwinding of the spring, and also causes it to deliver energy at a non-uniform rate.

One of the objects of the present invention is to provide a power spring of improved construction which is handled with facility, and which may be readily installed or replaced in the apparatus in which it is used.

Another object is to provide an improved power spring which delivers its stored energy with reduced friction and binding of the unwinding coils.

Another object is to provide an improved power spring in a self-contained unit which eliminates the necessity of an additional keeper during transit, or an enclosing barrel or housing in use.

Still another object is to provide an improved power spring of simple and compact construction which requires less materials than prior constructions, and is produced at a lower cost for materials and labor.

These and other objects will become more apparent from the following description and drawings in which like reference characters denote like parts throughout the several views. It is to be expressly understood, however, that the drawings are for the purpose of illustration only and to teach one skilled in the art how to practice the invention and are not a definition of the limits of the invention, reference being had for this purpose to the appended claims.

In the drawings:

FIGURE 1 is a plan view of a display apparatus wherein a novel power spring which constitutes one embodiment of the invention is installed between a rotating barrel and a stationary axial post;

FIGURE 2 is a side elevation of the display apparatus partly in section to show the relationship of the coils of the spring in relaxed or unwound condition;

FIGURE 3 is a sectional plan view of the power spring when wound tightly around the axial post and showing the bridle extending between adjacent coils to a position opposite the end anchored to the barrel;

FIGURE 4 is a perspective view of the outer coils of the power spring of FIGURES 1 to 3, showing overlapping portions of the first loop and bridle attached by a single rivet and the terminal end of the spring formed into a hook for anchoring it to a housing or barrel;

FIGURE 5 is a view similar to FIGURE 4 showing a power spring which constitutes another embodiment of the invention wherein the spring has a slotted opening in its end portion for anchoring it and mounting it as a unit;

FIGURE 6 is a side elevation of the power spring of FIGURE 5 showing it mounted as a self-supporting unit;

FIGURE 7 is a perspective view of the outer coil of a power spring which constitutes another embodiment of the invention wherein the spring has an outer closed band of spring material with the power spring and bridle enclosed in and attached to the band;

FIGURE 8 is a sectional view on line 8—8 of FIGURE 7 showing the end of the spring and bridle attached to the band by one rivet; and, FIGURE 9 is a sectional view on line 9—9 of FIGURE 7 to show the overlapping portions of the band connected by another rivet.

In FIGURES 1 to 3 of the drawings a power spring 10 incorporating the novel features of the present invention is shown installed in a display apparatus 11 to illustrate its construction and mode of operation. The display apparatus comprises a barrel 12 mounted to rotate on a fixed post 13 projecting from a base 14. The barrel 12 includes a disc 15 having a peripheral wall 16 forming a cylindrical pocket 17. Wall 16 is slotted to provide an anchoring shoulder 18, and post 13 is slotted to provide an anchoring shoulder 19. As shown in FIGURE 2, the right-hand end of post 13 is reduced to provide a rigid mounting spindle which is fixed in base 14, and the left-hand end of the post is similarly reduced.

Spring 10 is positioned in the cylindrical pocket 17 of the barrel 12, and is helically coiled with hooked ends 20 and 21 anchored to the shoulders 18 and 19 on the wall of the barrel and post 13, respectively. A face plate or disc 22 similar to disc 15 and of a transparent material overlies the pocket and the peripheral wall 16, and the discs 15 and 22 project outwardly beyond the peripheral wall to form a reel spool 23. A pull cord 24 is anchored to and wound onto the reel spool with its free end extending through a guide slot 25 in the fixed base 14 and having a knob 26 thereon. Thus, by pulling the knob 26 and pull cord 24, the barrel 12 is rotated on the post 13 to wind the spring around the post.

In the various illustrative embodiments of the invention, each of the springs is permanently retained within an outer band formed by riveting together the outer coil or turn of the spring. In this way, the spring becomes a permanently-coiled, unitary structure, with a single length of the strip of tempered spring steel forming the retaining band and also the coiled spring which it encloses. Accordingly, as shown best in FIGURE 3, at the left of the outer-hooked end 20 of spring 10, there is a rivet 31 which extends through the outer end of the spring and the next adjacent turn so as to securely hold the outer turn into a fixed loop or band 32. Hence, the coiled spring is in fact only the portion which extends clockwise (to the left of FIGURES 1 and 3) of rivet 31, even though it is integral with the band 32 and the anchoring portion at the right of the rivet which terminates in hook 20.

Rivet 31 also extends through and rigidly attaches a bridle 30 to the inside surface of the retaining band 32 and the adjacent end of the spring proper. Bridle 30 is an unbent length of the spring strip from which spring 10 is made, and both the spring and the bridle are similarly tempered. Bridle 30 projects to the right from rivet 31 beyond the zone of attachment wherein hook 20 engages shoulder 18; and, it extends to the left from rivet 31 through an arc of substantially 145° when the spring is in the unwound condition of FIGURE 1. When spring 10 is in the fully-wound position of FIGURE 3, the bridle extends through a greater arc, as shown. Hence, as the spring is wound toward the condition of FIGURE 3, the portion of bridle 30 at the left of the rivet resists the flexing to a smaller radius coil of the adjacent portion of spring 10. That is, this portion of the bridle tends to hold the outer end of the spring against the adjacent surface of the retaining band 32. However, the free end of this portion of the bridle tends to straighten out as the spring is wound and forms into a chord between the outer turn of the spring and the next adjacent inner coil. This action of the bridle holds the coiling spring symmetrical with respect to post 13, so that there is a free winding movement of the inner end of the spring around the post. The symmetrical condition prevents objectionable friction between the adjacent coils as has been encountered with similar springs in the past. Hence, assuming that the spring is being wound starting from the completely unwound condition of FIGURE 1, the initial winding causes the spring to form into a free spiral with all of the coils going freely, without contact with each other. Continued winding causes the inner end of the spring to start to form into a tight spiral coil on post 13. In the meantime, the end portion of the bridle forms into a chord and holds the adjacent coils from each other. As the winding continues, the coils are tightly wound from the inside to the fully wound condition of FIGURE 3. The tendency for the wound coils to become asymmetrical is resisted by the bridle to a sufficient extent to prevent objectionable friction and uneven movement between the adjacent coils. Similarly, the bridle holds the wound spring symmetrical as the spring is being unwound. This insures that the spring exerts unvarying torque and prevents objectionable friction and uneven movement between the coils.

The portion of the bridle which extends to the right of the rivet 31 in FIGURES 1 and 3 acts to reinforce the band 32 and the rivet throughout the entire zone of the ends of the band and the spring attachment formed by hook 20. This portion of the bridle also distributes the forces so as to prevent objectionable concentration of flexing actions and the metal fatigue which would result.

In the embodiments of FIGURES 5 to 9, the power springs are identical with spring 10, except as is specifically pointed out. Spring 33 of FIGURES 5 and 6 has a slotted outer end portion 34, with a hole 35 therein. This spring may be adjustably mounted by a screw or bolt 37 upon a fixed bracket 36. A central post 40 is attached to the inner anchor hook 39 of the spring. Thus the spring 33 is supported as a unit from its end portion 34 and without an enclosing barrel or housing. The spring is wound by turning the post 40, and the unwinding of the spring turns this post.

In the embodiment of FIGURES 7, 8 and 9, the enclosing band 42 is attached together by a rivet 43, and the end portion 44 has an outer anchor hook 45. In this embodiment, the bridle 48 is attached to the outer band by a second rivet 49. Hence, the fixed enclosing band is formed by substantially one and one-half turns of the spring strip, and the bridle extends from a zone substantially opposite the zone where the outer end of the spring is attached.

In the illustrative embodiments of the invention, the outer bands are attached together and the bridles are attached in place by rivets. The invention contemplates that other attaching means, such as spot welding, may be used when appropriate and expedient. The lengths of the bridles and their forms may be varied when desirable.

It has been pointed out above that the springs constructed in accordance with the present invention constitute self-contained, unitary structures which do not require the use of storage or retaining rings or barrels. They may be installed, and later removed and replaced without difficulty or hazard. These springs may be connected in mechanisms so that either the barrel or the post may be turned for winding the spring, and so that either is turned for unwinding. Hence, the invention is adaptable to many conditions of use and operation, and to many different types of spring mechanisms.

It will now be observed that: the present invention provides a construction in a power spring which facilitates initial installation and replacement of broken or defective springs; the improved construction of the present invention controls the unwinding of the coils of the spring to reduce friction and binding to a minimum; the power spring construction of the present invention provides a closed band at its outer periphery which eliminates the necessity of a separate support or holder for maintaining the coils of the springs in wound relationship during handling and shipment or during installation into a barrel or housing; the outer closed loop of the spring itself constitutes a barrel or housing so that such specially formed elements may be eliminated in certain installations and designs; the present invention provides a power spring which is of simple and compact construction, economical to manufacture, and one which is reliable in operation.

While several embodiments are herein illustrated and described, it will be understood that further changes may be made in the construction and arrangement of elements without departing from the spirit or scope of the invention. Therefore, without limitation in this respect, the invention is defined by the following claims.

1. A self-contained and self-supporting power spring adapted to be easily and quickly installed and removed, comprising an outer coil having overlapping portions connected to form a fixed outer band, inner free coils extending from the fixed outer band, the end portion of the outer coil extending outwardly from the band, anchoring means on the extending end of the outer coil, a bridle of strip spring material attached to the band and extending between adjacent inner free coils and flexed by said coils to conform to the contour thereof, and one side of the free end portion of the bridle contacting one coil at spaced points and the other side engaging the next adjacent inner coil at a single point between the spaced points at a position opposite the anchoring means to restrain the inner coil from movement radially and hold the adjacent coils spaced from each other.

2. A self-contained power spring unit comprising a plurality of successive coils wound helically one within the other, means connecting overlapping portions of an outer coil to provide an enclosing band for the inner free coils extending therefrom, the end portion of the outer coil extending beyond the means connecting the overlapping portions and formed to provide an anchoring structure for the outer end of the power spring, a separate bridle of spring strip material permanently attached intermediate its ends to the inner periphery of the band with one end extending beyond the structure for anchoring the outer end of the spring and the opposite end extending to the side of the power spring opposite the anchoring means, and said bridle having a free end extending between adjacent free coils arcuately with respect to the anchoring structure at the extended end of the outer coil to resist movement of the outer free coil inwardly from the band.

3. A self-contained power spring adapted to be easily and quickly installed and removed, comprising an outer coil having overlapping portions connected to form a fixed outer band, inner free coils extending from the fixed outer band, the end portion of the outer coil extending outwardly from the band, anchoring means on the extended end of the outer coil, a bridle of strip spring material attached to the band and extending between adjacent inner free coils and flexed by said coils to conform to the contour thereof, said spring bridle being of a length to extend through an arc greater than 180° and less than 360° of the adjacent coils, and when the spring is wound one side of the free end portion of the bridle contacting one coil at spaced points and the other side engaging the next adjacent inner coil at a single point between the spaced points at one side of its connection to the outer band to restrain the inner coil from movement radially and hold the adjacent coils spaced from each other.

4. A self-contained power spring in accordance with claim 3 in which the outer band and inner coils are one continuous strip, the overlapping portions of the outer coil being attached to form the band, and a single connection for attaching the overlapping portions of the outer coil to form the band and the bridle to the band.

5. A self-contained power spring in accordance with claim 3 in which the outer band and inner coils are formed as separate attached parts.

6. A self-contained power spring having a fixed outer band portion, a power spring portion and a bridle extending from the outer band between adjacent coils of the power spring portion so that it is adapted to be easily and quickly installed and removed, comprising an outer coil having overlapping portions and a connection to form the fixed outer band portion, the inner free coils forming said power spring portion extending from the connection of said fixed outer band, anchoring means projecting from said connection of the outer coil, said bridle comprising strip spring material extending from the outer band portion between adjacent inner free coils and flexed by said coils to conform to the contour thereof, said spring bridle being of a length to extend through an arc greater than 90° and less than 180° of the adjacent coils from the connection when the spring is unwound, and when the spring is wound one side of the free end portion of the bridle contacting one coil at spaced points and the other side engaging the next adjacent inner coil at a single point between the spaced points at one side of its connection to the outer band to restrain the inner coil from movement radially and hold the adjacent coils spaced from each other.

References Cited in the file of this patent

UNITED STATES PATENTS

| 1,478,173 | Clark | Dec. 18, 1923 |
| 1,964,280 | Witchger | June 26, 1934 |
| 2,797,435 | Decker et al. | July 2, 1957 |

FOREIGN PATENTS

| 73,812 | Holland | Jan. 15, 1954 |
| 902,921 | Germany | Jan. 28, 1954 |